United States Patent
Ferreira et al.

(10) Patent No.: US 12,425,419 B2
(45) Date of Patent: Sep. 23, 2025

(54) LIGHTWEIGHT ATTACKER IDENTIFICATION METHOD FOR FEDERATED LEARNING WITH SECURE BYZANTINE-ROBUST AGGREGATION VIA CLUSTERING

(71) Applicant: Dell Products L.P., Round Rock, TX (US)

(72) Inventors: Paulo Abelha Ferreira, Rio de Janeiro (BR); Pablo Nascimento da Silva, Niterói (BR); Maira Beatriz Hernandez Moran, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 351 days.

(21) Appl. No.: 18/065,064

(22) Filed: Dec. 13, 2022

(65) Prior Publication Data
US 2024/0195816 A1 Jun. 13, 2024

(51) Int. Cl.
*H04L 9/40* (2022.01)
*G06N 20/00* (2019.01)

(52) U.S. Cl.
CPC ......... *H04L 63/1416* (2013.01); *G06N 20/00* (2019.01); *H04L 63/20* (2013.01)

(58) Field of Classification Search
CPC ..... G06N 20/20; G06N 3/098; H04L 63/1425
See application file for complete search history.

(56) References Cited

U.S. PATENT DOCUMENTS

| | | | |
|---|---|---|---|
| 2015/0058976 A1* | 2/2015 | Carney | H04L 63/1408 726/22 |
| 2020/0285980 A1* | 9/2020 | Sharad | G06N 20/20 |
| 2022/0108177 A1* | 4/2022 | Samek | G06N 3/045 |
| 2023/0186167 A1* | 6/2023 | Singla | G06N 3/098 706/12 |
| 2024/0012942 A1* | 1/2024 | Zhou | G06N 20/00 |

OTHER PUBLICATIONS

You et al. Poisoning attack detection using client historical similarity in non-iid environments Noida, India, Jan. 27-28, 2022, pp. 439-447, doi: 10.1109/Confluence52989.2022.9734158 (Year: 2022).*
Velicheti, Raj Kiriti, Derek Xia, and Oluwasanmi Koyejo, titled "Secure Byzantine-Robust Distributed Learning via Clustering," arXiv preprint arXiv:2110.02940 (2021).

(Continued)

*Primary Examiner* — David J Pearson
(74) *Attorney, Agent, or Firm* — Workman Nydegger

(57) ABSTRACT

One method includes receiving, at a central node, a respective gradient from each node of a cluster, and each of the gradients comprises a respective update to a global machine learning model maintained at the central node, aggregating, by the central node, the gradients to obtain an aggregated gradient for the cluster, and the aggregated gradient is part of a list of aggregated gradients, running, by the central node, a robust aggregation operation on the aggregated gradients in the list to obtain an outlier score for the cluster, and when the outlier score equals or exceeds a specified value, or falls within a specified range of values, identifying the cluster as an outlier, and identifying nodes within the cluster as suspicious.

18 Claims, 7 Drawing Sheets

(56) References Cited

OTHER PUBLICATIONS

U.S. Appl. No. 18/045,527, titled "Revealing Byzantine Attackers through Smart Re-clustering in Federated Learning," filed Oct. 11, 2022.

Blanco-Justicia, Alberto, Domingo-Ferrer, Joseph, Martínez, Sergio, Sánchez, David, Flanagan, Adrian, and Tan, Kuan Eeik, titled "Achieving Security and Privacy in Federated Learning Systems: Survey, Research Challenges and Future Directions," Engineering Applications of Artificial Intelligence 106 (2021): 104468.

C. Xie, S. Koyejo, and I. Gupta, titled "Zeno++: Robust Fully Asynchronous SGD," In International Conference on Machine Learning, pp. 10495-10503. PMLR, 2020.

\* cited by examiner

Algorithm 1 SHARE (Secure Hierarchical Robust Aggregation)

0: Server:
1: for $t = 0, \ldots, T-1$ do
2:    for $r = 1, \ldots, R$ do
3:       Assign clients to clusters $S = \mathcal{M}_1 \cup \ldots \mathcal{M}_i \ldots \cup \mathcal{M}_c$ with $|\mathcal{M}_i| = |\mathcal{M}_j| \forall i, j \in [c]$
4:       Compute secure average $g_j^r \leftarrow \text{SecureAggr}(\{\Delta_i\}_{i \in \mathcal{M}_j}) = \sum_{i \in \mathcal{M}_j} u_i, \forall i \in [c]$
5:       $g^r \leftarrow \text{RobustAggr}(\{g_j^r\}_{j \in [c]})$
6:    end for
7:    if stopping criteria met then
8:       break
9:    end if
10:   Push $x^t = x^{t-1} + \eta \frac{1}{R} \sum_r g^r$ to the clients
11: end for
Client:
12: for each client $i \in S$ (if honest) in parallel do
13:    $x_{i,0}^t \leftarrow x^t$
14:    for $k = 0, \ldots, K-1$ do
15:       Compute an unbiased estimate $g_{i,k}^t$ of $\nabla f_i(x_{i,k}^t)$
16:       $x_{i,k+1}^t \leftarrow \text{ClientOptimize}(x_{i,k}^t, g_{i,k}^t, \eta_l, k)$
17:    end for
18:    $\Delta_i = \frac{n_i}{n}(x_{i,K}^t - x^t)$
19:    Push $\Delta_i$ to the assigned clusters using secure aggregation
20: end for
21: return $x^T$

FIG. 2

Modified SHARE Algorithm - ALGORITHM 2

0: Server
1: $s \leftarrow [0]*[c]$ # Initialize array of suspects of length number of clients
1: for $t = 0, \ldots, T-1$ do
2:   for $r = 1, \ldots, R$ do
3:     Assign clients to clusters $S = \mathcal{M}_1 \cup \ldots \mathcal{M}_i \ldots \cup \mathcal{M}_c$ with $|\mathcal{M}_i| = |\mathcal{M}_j| \forall i, j \in [c]$
4:     Compute secure average $g_j^r \leftarrow \textit{SecureAggr}(\{\Delta_i\}_{i \in \mathcal{M}_j}) = \sum_{i \in \mathcal{M}_j} u_i, \forall i \in [c]$
5:     $g^r, s^r \leftarrow \textit{RobustAggrIdent}(\{g_j^r\}_{j \in [c]})$
6:   $s \leftarrow \textit{UpdateSuspects}(s, s^r, r+t)$
6: end for

FIG. 3

*RobustAggrIdent - Median* ($g^r$, M) - ALGORITHM 3

\# Input $g^r$: List of cluster gradients for current re-clustering $r$
\# Input M: All $M_i$ containing clients for each cluster $i$ 0: $g_{median} \leftarrow GeometricMedian(g^r)$
1: $s \leftarrow [0] * |c|$ # Intialize array of suspects of length number of clients
2: $c_{idx} \leftarrow 1$ # Current cluster index
3: $g_{out} \leftarrow []$
3: for $g$ in $g^r$ do
4:    if RobustDist ($g, g_{median}$) > $\tau$: # Cluster gradient is outlier
5:       for $c$ in $M_{c_{idx}}$ : # Set all clients of cluster as suspect
6:          $s[c] = 1$
7:    else
8:       $g_{out}$.append ($g$)
8:    $c_{idx}$ + +
8: end for
9: return $g_{out}, s$

FIG. 4

*UpdateSuspects* $(s, s^r, r)$ - ALGORITHM 4

0: $s \leftarrow \frac{(r-1)}{r} s + \frac{s^r}{r}$  # Maintain a running mean, incorporating $s^r$ into $s$ 1: return $s$

FIG. 5 ial or indispensable element of any invention or embodi-
LIGHTWEIGHT ATTACKER IDENTIFICATION METHOD FOR FEDERATED LEARNING WITH SECURE BYZANTINE-ROBUST AGGREGATION VIA CLUSTERING

FIELD OF THE INVENTION

Some embodiments of the present invention generally relate federated learning. More particularly, at least some embodiments of the invention relate to systems, hardware, software, computer-readable media, and methods, for detecting, identifying, and responding to, Byzantine attacks.

BACKGROUND

Federated Learning (FL) is a machine learning technique capable of providing model training from distributed devices while keeping their respective data private. This can be of great value for a business since it may be possible to train machine learning models for a variety of distributed edge devices and apply them to various products. A business may benefit from providing solutions and infrastructure for customers in this domain, or by using it internally in its own products.

However, the decentralized nature of FL can pose some security concerns since a system must send model updates from the nodes, such as edge devices, to the central server. When a Byzantine client attacks the federation, it can change the results of the final model. Thus, protecting the model updates to reduce the effect of these attacks may help to ensure the correctness, and privacy, of the global model. IN general, Byzantine attacks are those where one or more nodes are taken over by malicious actors that can then disrupt coordination and data transfer.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 2 discloses aspects of a SHARE algorithm.

FIG. 3 discloses aspects of a modified SHARE algorithm, according to an embodiment, that enables tracking of suspected Byzantine nodes.

FIG. 4 discloses an example RobustAggrIdent algorithm that uses a median to assign clients as suspects if they belong to outlier clusters.

FIG. 5 discloses an example algorithm including an UpdateSuspects function that keeps track of a 'suspicion score' for each client.

DETAILED DESCRIPTION OF SOME EXAMPLE EMBODIMENTS

Figure 1:
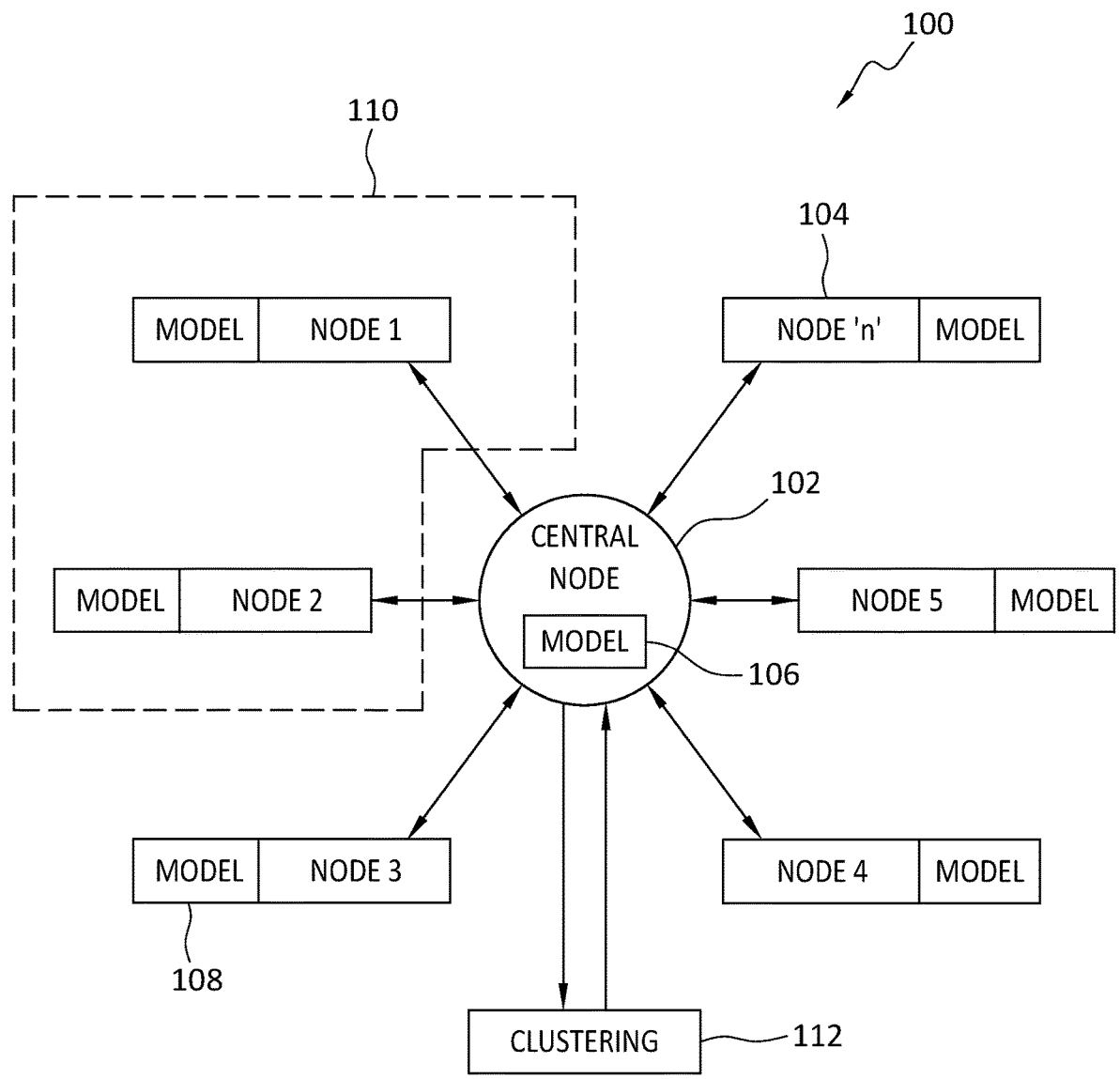
FIG. 1 discloses aspects of an example operating environment for an embodiment.

Some embodiments of the present invention generally relate federated learning. More particularly, at least some embodiments of the invention relate to systems, hardware, software, computer-readable media, and methods, for detecting, identifying, and responding to, Byzantine attacks.

In general, an embodiment of the invention may comprise a protocol, possibly based on the SHARE protocol (Secure Hierarchical Robust Aggregation), to actively identify malicious players in a federated learning (FL) scenario and environment that includes secure-robust aggregation, via clustering, to protect the gradients flowing from the edge nodes to a central server. An embodiment may be able to identify malicious nodes by giving them 'suspicion scores' but the embodiment may operate in such a way as to avoid interfering in the training process, that is, the FL process. The scores may then be used to inform security policy decision making.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that a bad actor carrying out a Byzantine attack occurring in an FL environment may be detected and identified as such, and the detection and identification may be performed without stopping the FL training, and without controlling a node clustering process. An embodiment may assign a 'suspicion score' to an edge node that may be used to prevent the edge node from being included in a cluster of edge nodes. Various other advantages of some example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, a federated learning process. With attention now to FIG. 1, one example embodiment of an operating environment is denoted generally at 100. As shown, a central node 102 may communicate with a group of nodes 104 that may collectively define a federation that may be used to train and maintain a central model 106 hosted at the central node 102. There may be any number 'n' of nodes, and a federation may comprise a subset of the nodes 104, or all of the nodes 104.

In more detail, one or more of the nodes 104 may each run a respective instance 108 of the central model 106. Each node 104 may train its respective model instance 108, and then transmit model instance 108 updates, such as in the form of gradients, to the central node 102. The central node 102 may then update the central model 106 based on the updates received from the nodes 104, and then disseminate the updated central model to the nodes 104. In an embodiment, the central node 102 may comprise a server, and one or more of the nodes 104 may comprise an edge node operating in an edge computing environment. Any node 104 may comprise, for example, a mobile device, or IoT (internet of things) device. A node 104 may be associated with a particular entity, such as a business entity for example, and a node 104 may use confidential and/or proprietary information to train and evaluate its model instance 108.

As discussed in more detail below, one or more clusters 110, each comprising one or more nodes 104, may be defined. The nodes 104 in the cluster 110 may participate in the updating of the central model 106. In an embodiment, clustering of the nodes 104 may be performed by a clustering module 112 which may be hosted at the central node 102, or may comprise a stand-alone entity. Any number of clusters 110 may be defined, and a cluster 110 may have any number of nodes 104.

B. Overview

As noted earlier herein, Federated Learning (FL) is a machine learning technique capable of providing model training from distributed devices while keeping their respective data private. The decentralized nature of FL can pose security concerns since a system must send model updates from the clients, or nodes, to a central server. SHARE (Secure Hierarchical Robust Aggregation) is a method proposed to improve security in FL settings. See, Velicheti, Raj Kiriti, Derek Xia, and Oluwasanmi Koyejo. "Secure Byzantine-Robust Distributed Learning via Clustering." arXiv preprint arXiv:2110.02940 (2021) ("Velicheti"), which is incorporated herein in its entirety by this reference.

In Velicheti, the authors proposed a method for clustering client nodes N times, and applying a secure aggregation followed by a robust aggregation method. This approach may partially mitigate some attacks. Nevertheless, a considerable challenge remains, and that is how to identify the Byzantine clients to improve the security of FL systems, and thus decrease the potential for attacks.

Thus, some embodiments of the invention comprise a method that may solve various problems. Particularly, an embodiment may: [1] identify Byzantine client nodes in a resource-constrained federation; and [2] run the method without stopping the training protocol, and without controlling the clustering process.

In more detail, one embodiment comprises a method for identifying bad players, such as edge nodes for example, in a federated learning process and environment. The method may operate such that it does not manipulate the re-clusterings defined by a secure-robust aggregation process, while ensuring the protection of the gradients created and sent by the clients, so that the gradients cannot be accessed by the server, or central node. This method may be able to identify suspicious clients during the training process so that those clients may be eliminated from the training of the final model. Particularly, the method may prevent the bad actors from affecting the training of the global model, by disregarding the gradient updates generated by the bad actors.

In this way, the training process, that is, the FL process, does not have to be interrupted at the end of each round of training for additional processing referent to an intentional re-clustering. An embodiment may define and assign of 'suspicion scores' associated to one or more of the edge nodes. Such scores may be stored and analyzed to identify suspicious clients. These scores may indicate, for example, how frequently a node provides divergent gradients to the central node, that is, gradients with discrepancies relative to the other gradients provided by nodes in the same cluster. Nodes identified as being suspicious can then be quarantined, and/or other appropriate action taken to prevent those nodes from participating in central model updates.

C. Context for Some Example Embodiments

C.1 General Considerations

The model training in an example FL process may be performed iteratively by clients using their own local data, and then the obtained local updates are aggregated in order to obtain the global model. Privacy may be improved by implementing the SHARE protocol, which includes grouping clients in clusters to calculate a combined/unified update of the cluster, and then sending the unified update to the server/central node. In this way, the central node does not directly access the individual updates provided by the clients. The process of selecting the clients to compose each cluster can vary. In embodiment, a cluster may comprise a group of randomly selected nodes. In some instances, one or more clusters may be pre-defined in order to prevent the client allocation, or clustering, process from becoming a bottleneck during performance of the FL process.

With the foregoing in view, a Byzantine attack typically involves sending, from one or more clients or nodes, manipulated client updates to negatively influence the global model and prevent the convergence of the global model. In one effort to identify Byzantine attacks, the cluster assignment became dependent on the results of the previous local training results, which demanded extra computing power to define to which cluster each client should be assigned. This approach is problematic since after each FL training round, the training process must be interrupted to enable the formation of each cluster. A better approach, implemented by one or more embodiments of the invention, is to define a detection method for Byzantine attacks that does not rely on defining the clusters. That is, in this approach, the clustering may be performed without interrupting the FL training process except to remove any identified attackers.

Other approaches may be used to for identifying the bad players by manipulating the clustering process present in the secure aggregation. However, these approaches may be prohibitive in some scenarios due to resource constraints, or authorization problems. For example, elements of an operating environment, such as nodes and a central node, may be constrained in the resources that they are able to apply to clustering and other processes. Such resources may include, for example, memory, storage, latency, and processing power. Thus, an embodiment of the invention may not only identify Byzantine client nodes in a resource-constrained federation, but may also run a node clustering process without stopping the training protocol, and without controlling the node clustering process.

C.2 Byzantine Attacks in Federated Learning (FL)

The main objective of this attack is to prevent the correct convergence of a global model. The attack may be carried out by manipulating one or more of the clients, or nodes, to send defective model updates to the server that maintains the global models, so as to thereby introduce incorrect bias in the model update aggregation process. A malicious client can induce the aggregation rule result ($F_{lin}$) to yield a constant value T. Considering that $F_{lin}$ is defined as $F_{lin}$ ($\delta 1, \ldots, \delta m$)=$\rho_u \alpha_u \delta_u$, where each $\alpha_u$ are non-zero scalars. If the Byzantine malicious client sends $\delta_m = (1/\alpha_m)^*$ $T - \rho^{m-1}{}_{u=1} (\alpha_u/\alpha_m)^* \delta_u$, then $F_{lin}$=T. See, Blanco-Justicia, Alberto, Domingo-Ferrer, Joseph, Martínez, Sergio, Sánchez, David, Flanagan, Adrian, and Tan, Kuan Eeik. "Achieving security and privacy in federated learning systems: Survey, research challenges and future directions." Engineering Applications of Artificial Intelligence 106 (2021): 104468.

Supposing that the malicious client could access the updates of other clients, the attack would be immediate. However, this may not be a realistic scenario, since most FL configurations implement protocols to ensure privacy, including protecting the updates from unauthorized access. In this way, the malicious client must estimate the other client updates, or the sum of those updates. Note that when the FL training process is advanced, the model is close to convergence, so the updates sent by the clients in consecutive rounds may be very similar to each other. Thus, the malicious client may be able to make a good estimate of the sum of the updates of other clients from a previous round, just by subtracting its own update, that is, the update provided by the malicious node, from the global model. Based on this information, the malicious client tries to replace the global model. For that, the malicious node creates a special local update that nullifies the updates submitted by the other clients, and also boosts the update provided by the malicious node.

C.3 SHARE—Secure Hierarchical Robust Aggregation

According to Velicheti, the SHARE framework may help to promote privacy for FL settings. Particularly, SHARE is a framework that incorporates defenses against Byzantine attacks, that is composed of two steps. In the first step, the clients are allocated in clusters randomly. Clients in each cluster mask their own updates using pairwise secret keys shared between them. This enhances the privacy of the clients and their individual updates, the server learns only the mean value of those updates. In the next step, the secure cluster averages are filtered through robust aggregation such as, for example, median or Zeno, in order to eliminate clusters with Byzantine clients, according to their updates. These two steps are repeated several times, and in each global epoch, the clients are re-clustered randomly. One of the main limitations of this framework is the communications cost due to the key exchange sharing. Also, random re-clustering in the worst case might demand several global rounds before identifying Byzantine clients. An Algorithm 1, denoted at 200 in FIG. 2, summarizes the SHARE framework.

In the Algorithm 1, the two main steps are Secure Aggregation (SecureAggr) and Robust Aggregation (RobustAggr). The SHARE protocol runs on top of a generic FL, assuming there is clustering of clients, and further assuming that Secure Aggregation is performed at each cluster, generating one (summed) gradient $g^r{}_j$ per cluster j and per re-clustering round r. That is, SHARE runs a loop of R re-clusterings, and at each re-clustering, SHARE creates an aggregated $g^r$ by computing Robust Aggregation with all the $g^r$ for the current re-clustering round. After R re-clustering rounds, the process ends up with a list of size R containing different aggregated gradients $g^r$. When it is time to compute the central gradient, SHARE then computes a mean overall $g^r$.

D. Detailed Description of Some Example Embodiments

D.1 Brief Introduction

Some embodiments of the invention comprise a method for identifying Byzantine clients in a federated learning setting, based on secure-robust aggregation, that minimizes interference in the training process and clients/nodes allocation. The secure-robust aggregation process may prevent the server from accessing the gradients generated at the nodes.

Note that as used herein, a 'robust aggregation' comprises, but is not limited to, a method that takes in a list of gradients and outputs an aggregation of those gradients leaving some of the gradients out of the calculation. For example, suppose there is a list of gradients, a few of which come from malicious nodes with bad updates, which will reflect on these malicious gradients being statistically different than the fair, or non-malicious, gradients. In this example case, a robust aggregation method may take in all those gradients, identify the malicious gradient(s) as statistically different from the other gradients, and then calculate an aggregation without using the malicious gradient(s).

A simple example of a robust aggregation method may be to take a statistical measure, such as the median, of all gradients. The median may be useful in some instances, insofar as it is less sensitive to the tails of a distribution, and so may tend to disregard data points that vary significantly from data points not located in the tails.

A more complex aggregation example is a method referred to as Zeno++(see Velicheti), which uses a central dataset to test a model and identify gradients that are too different. In addition to aggregating gradients, a robust aggregation method may also return a score for each gradient on how much of an "outlier" the gradient is. Again, a simple example would be, for instance, outputting the distance, or difference, of each gradient to the mean of all the gradients. In general then, a robust aggregation method may operate to output an "outlier" score for each gradient, where that score indicates the relative closeness of that gradient to "normal," where what is designated as normal may be defined in relation to all of the gradients.

In an embodiment of the invention, a method may first aggregate all gradients from a given cluster, in a non-robust manner, thus obtaining a list of gradients, one gradient per cluster. Then, the method may run a robust aggregation process taking in this list of gradients (one per cluster) and output an 'outlier' score. Therefore, as an output of this robust aggregation process, there may be obtained a score of 'outlier' for each cluster, that is s/\r. These cluster outlier scores may then be used to uncover suspicious clients.

Thus, a method according to one embodiment may enable the identification of Byzantine attackers during the training process so that those attackers, or nodes, can be eliminated from the training of the final model, that is, updates provided by the attackers would not be considered in the training of the global model. One embodiment of the invention does not depend on, nor perform, total clustering control. That is, this embodiment does not require intentionally assigning the clients to specific clusters each round of the FL training process, depending on their risk of being malicious. Instead, this embodiment, which may comprise a lightweight method for identifying bad players in federated learning, may only store and analyze 'suspicion scores' to perform the identification of bad actors.

D.2 SHARE Algorithm Focused on Byzantine Identification

In order to identify the attackers, without actively interfering in the clustering step, an embodiment comprises a method that analyzes the frequency with which a client was considered an outlier, employing a 'suspicion score'. This score provides an estimation as to the chance of that any given client, or node, will be a Byzantine node. In this way, the suspicious nodes might be designated as suspicious and dealt with, for instance by a security policy.

An embodiment may comprise a method that is a modified version of the SHARE algorithm disclosed in FIG. 2 (see Velicheti) in which the method is also able to track down Byzantine suspects. An embodiment of the invention comprises two modifications to the SHARE algorithm, namely: (1) a RobustAggrIdent function that not only executes as the original RobustAggr function from SHARE, but also identifies and returns an identification of which nodes were part of clusters that were outliers; (2) an UpdateSuspects function that enables the creating, updating, and tracking, of a data structure to map suspect, that is, 'suspicious,' nodes.

The Algorithm 2, denoted at 300 in FIG. 3, is a modified SHARE algorithm according to one example embodiment of the invention. As shown in FIG. 3, the Algorithm 2 may start with a list whose length is the number of clients, or nodes, with all clients initially being assigned a 'suspicion score' of zero (0), meaning that, initially at least, none of the clients is identified as being suspected of being a Byzantine attacker. By way of contrast, a suspicion score of one (1) means maximally suspicious. As the re-clusterings, and rounds of federated learning, are performed, an embodiment may refine the suspicion scores by normalizing, such as by the number of re-clustering and FL rounds, the number of times a client is encountered in an outlier cluster, and the refined suspicion score may be a function of that number of times.

In Algorithm 2, the RobustAggrIdent function takes the place of the original RobustAggr from the original SHARE algorithm (Algorithm 1). As shown in Algorithm 2, the RobustAggrIdent function may be the second operation performed in each re-clustering round, where cluster gradients averages are evaluated to eliminate clusters with a possibly malicious update. A number of different techniques may be used as a measure of the robustness, such as, for example, trimmed mean, median, or more advanced algorithms. Algorithm 2 may maintain the same functionality as RobustAggr in Algorithm 1 but, unlike Algorithm 1, Algorithm 2 may additionally keep track of which client nodes were part of eliminated clusters.

Algorithm 3, denoted generally at 400 in FIG. 4, implements a RobustAggrIdent function that uses the median to assign clients as suspects if the clients, or nodes, belong to outlier clusters. Note that the use of a median value in one embodiment is presented only by way of example, and various other functions may be used in other embodiments. The RobustAggrIdent function may return the inlier gradients, that is, gradients that are not outliers (as does RobustAggr), and may also return a list assigning each client as suspect, or not, for that re-clustering round.

In Algorithm 4, generally denoted at 500 in FIG. 5, there is disclosed an embodiment of the UpdateSuspects function. In general, the UpdateSuspects function that keeps track of a 'suspicion score' for each client. In the example implementation of FIG. 5, an embodiment may keep a running mean of the current normalized 'suspicion score' per client. These scores may be normalized, for example, by the current number of re-clusterings so a comparable score may be generated that may be easily incorporated into other frameworks for security assessment. Note that the scope of the invention is not limited to the example function included in Algorithm 4, and functions other than a running mean may alternatively be employed for updating a list of suspect clients.

The list of suspect scores s may then be used by a security framework in order to trigger actions, or flag clients as suspects for further investigation. The actual actions taken using s could be incorporated into security frameworks to help automatically flag and guide policy.

D. Further Discussion

As will be apparent from this disclosure, example embodiments may comprise various features and aspects, a non-exhaustive list of which is set forth below. These example features and aspects are not intended to limit the scope of the invention in any way.

An embodiment may comprise a lightweight, at least in terms of resource consumption and/or interruption of an FL training process, method based on a modification of the SHARE protocol. Particularly, an embodiment may extend the SHARE protocol to identify Byzantine nodes in federated learning, but without interrupting an FL training process. In this way, an embodiment may ensure the security and privacy of the federation without substantially impacting the training process. At present, there are no known approaches for attacker identification that use a technique such as those disclosed herein in connection with one or more embodiments.

Finally, an embodiment may employ the modified SHARE protocol to identify suspicious clients during the training process so as to inform a security policy decision. Particularly, an embodiment may provide a numerical 'suspicion score' for each client so that even automatic and quantitative decision could be taken or used for flagging nodes in security policies.

E. Example Methods

Figure 6:
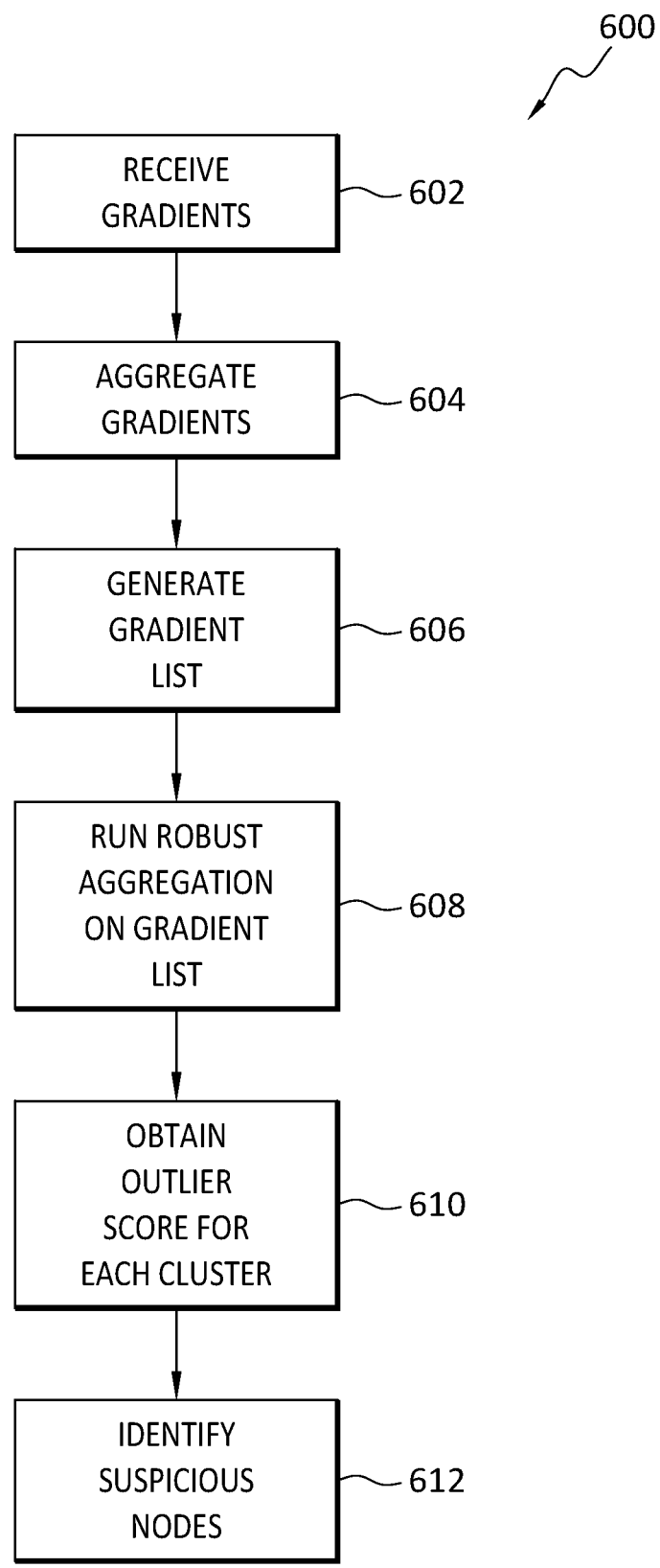
FIG. 6 discloses an example method according to one embodiment.

It is noted with respect to the disclosed methods, including the example method of FIG. 6, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 6, an example method according to one embodiment is denoted generally at 600. In an embodiment, part or all of the method 600 may be performed by a central node that maintains a central model using respective gradients provided by one or more edge nodes. Further, part or all of the method 600 may be performed as part of, and/or simultaneously with, an FL training process, and the method 600 may be performed in such a way as to avoid interruption of the FL training process and/or to reduce resource consumption relative, for example, to a conventional SHARE process.

The example method 600 may begin when a central node receives 602 a respective model update, which may comprise a gradient, from each node in a given cluster. This process of receiving gradients 602 may be performed for multiple different clusters. The received gradients may then be aggregated 604, such as on a cluster basis. As a result of the aggregation process 604, a list of gradients may then be generated 606 606. The list may comprise a respective gradient for each of the clusters.

Once the list of gradients has been generated 606, a robust aggregation process may then be run 608 on the gradients in the list. As a result of the performance of the robust aggregation process 608, a respective outlier score may be generated for each of the clusters. The outlier scores may be binary, for example, a cluster may either be identified as an outlier, or not. Alternatively, the outlier scores may lie within a defined range of values, and a cluster identified as an outlier if its outlier score is within a sub-range of values lying within the defined range of values.

After a cluster has been identified as an outlier, based on its determined outlier score 610, the nodes of the outlier cluster may be identified as suspicious 612 by virtue of their membership in an outlier cluster. In an embodiment, a statistical measure, such as a median cluster gradient value for example, may be used to identify a cluster as an outlier, and a node of that outlier cluster, therefore, as 'suspicious.' Any node(s) identified as being 'suspicious' may be prevented from participating in the updating of the global model maintained by the central node.

F. Further Example Embodiments

Following are some further example embodiments of the invention. These are presented only by way of example and are not intended to limit the scope of the invention in any way.

Embodiment 1. A method, comprising: [receiving, at a central node, a respective gradient from each node of a cluster, and each of the gradients comprises a respective update to a global machine learning model maintained at the central node; aggregating, by the central node, the gradients to obtain an aggregated gradient for the cluster, and the aggregated gradient is part of a list of aggregated gradients; running, by the central node, a robust aggregation operation on the aggregated gradients in the list to obtain an outlier score for the cluster; and when the outlier score equals or exceeds a specified value, or falls within a specified range of values, identifying the cluster as an outlier, and identifying nodes within the cluster as suspicious.

Embodiment 2. The method as recited in embodiment 1, wherein any node identified as suspicious is prevented from participating in updating the central model Embodiment 3. The method as recited in any of embodiments 1-2, wherein the robust aggregation operation uses a statistical measure to identify the cluster as an outlier.

Embodiment 4. The method as recited in any of embodiments 1-3, wherein the identifying of the cluster as an outlier is performed without requiring use of a re-clustering operation.

Embodiment 5. The method as recited in any of embodiments 1-4, wherein each node is initially assigned a suspicion score of zero.

Embodiment 6. The method as recited in any of embodiments 1-5, wherein a suspicion score of each node is updated each time a round of a federated learning process involving the nodes is performed.

Embodiment 7. The method as recited in any of embodiments 1-6, wherein each node comprises a respective edge device.

Embodiment 8. The method as recited in any of embodiments 1-7, wherein one of the suspicious nodes is a Byzantine node capable of performing a Byzantine attack on the central model.

Embodiment 9. The method as recited in any of embodiments 1-8, wherein a suspicion score of one of the suspicious nodes is used to determine a security policy.

Embodiment 10. The method as recited in any of embodiments 1-9, wherein as one or more rounds of federated learning and re-clustering are performed, respective suspicion scores for each of the nodes are refined using a normalization process.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
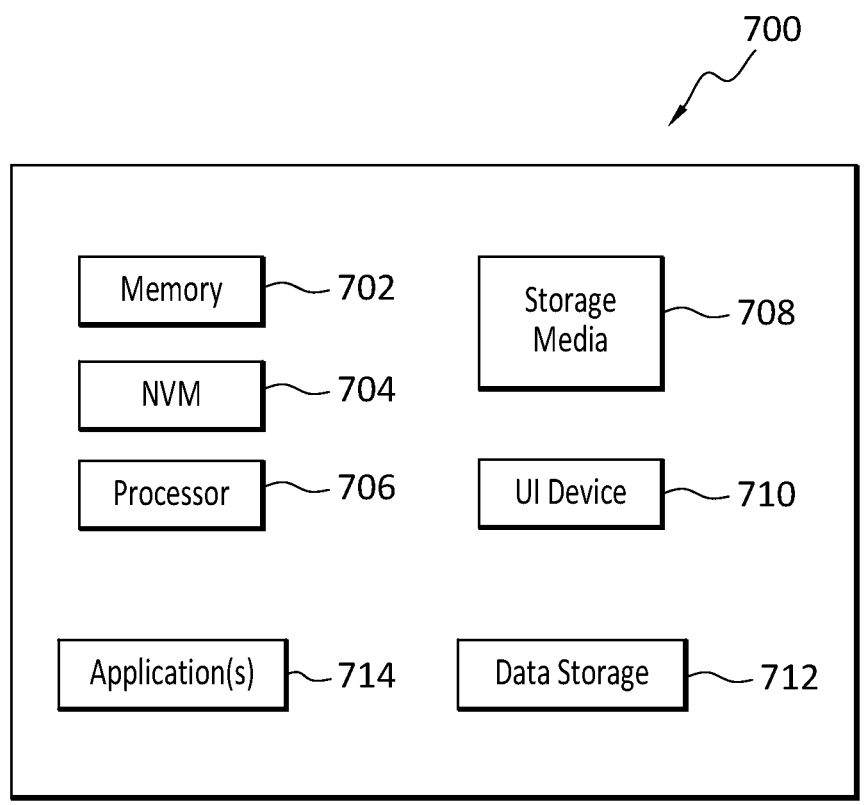
FIG. 7 discloses an example computing entity operable to perform any of the disclosed methods, processes, and operations.

With reference briefly now to FIG. 7, any one or more of the entities disclosed, or implied, by FIGS. 1-6 and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 7.

In the example of FIG. 7, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, UI (user interface) device 710, and data storage 712. One or more of the memory components 702 of the physical computing device 700 may take the form of solid state device (SSD) storage. As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   performing a federated learning process comprising:
      receiving, at a central node, a respective gradient from each node of a cluster, and each of the gradients comprises a respective update to a global machine learning model maintained at the central node;
      aggregating, by the central node, the gradients to obtain an aggregated gradient for the cluster, and the aggregated gradient is part of a list of aggregated gradients;
   running, by the central node, a robust aggregation operation on the aggregated gradients in the list to obtain an outlier score for the cluster;
   when the outlier score equals or exceeds a specified value, or falls within a specified range of values, identifying the cluster as an outlier, and identifying nodes within the cluster as suspicious;
   identifying one of the suspicious nodes as a Byzantine node; and
   determining that the Byzantine node is carrying out a Byzantine attack on the central model, wherein the federated learning process is allowed to continue [1] notwithstanding the determination that the Byzantine attack is being carried out, and [2] without modifying an ongoing re-clustering operation that does not involve the Byzantine node.

2. The method as recited in claim 1, wherein any node identified as suspicious is prevented from participating in updating the central model.

3. The method as recited in claim 1, wherein the robust aggregation operation uses a statistical measure to identify the cluster as an outlier.

4. The method as recited in claim 1, wherein the identifying of the cluster as an outlier is performed without requiring use of a re-clustering operation.

5. The method as recited in claim 1, wherein each node is initially assigned a suspicion score of zero.

6. The method as recited in claim 1, wherein a suspicion score of each node is updated each time a round of the federated learning process involving the nodes is performed.

7. The method as recited in claim 1, wherein each node comprises a respective edge device.

8. The method as recited in claim 1, wherein a suspicion score of one of the suspicious nodes is used to determine a security policy.

9. The method as recited in claim 1, wherein as one or more rounds of the federated learning process and a re-clustering process are performed, respective suspicion scores for each of the nodes are refined using a normalization process.

10. A non-transitory storage medium having stored therein instructions that are executable by one or more hardware processors to perform operations comprising:
performing a federated learning process comprising:
receiving, at a central node, a respective gradient from each node of a cluster, and each of the gradients comprises a respective update to a global machine learning model maintained at the central node;
aggregating, by the central node, the gradients to obtain an aggregated gradient for the cluster, and the aggregated gradient is part of a list of aggregated gradients;
running, by the central node, a robust aggregation operation on the aggregated gradients in the list to obtain an outlier score for the cluster;
when the outlier score equals or exceeds a specified value, or falls within a specified range of values, identifying the cluster as an outlier, and identifying nodes within the cluster as suspicious;
identifying one of the suspicious nodes as a Byzantine node; and
determining that the Byzantine node is carrying out a Byzantine attack on the central model, wherein the federated learning process is allowed to continue [1] notwithstanding the determination that the Byzantine attack is being carried out, and [2] without modifying an ongoing re-clustering operation that does not involve the Byzantine node.

11. The non-transitory storage medium as recited in claim 10, wherein any node identified as suspicious is prevented from participating in updating the central model.

12. The non-transitory storage medium as recited in claim 10, wherein the robust aggregation operation uses a statistical measure to identify the cluster as an outlier.

13. The non-transitory storage medium as recited in claim 10, wherein the identifying of the cluster as an outlier is performed without requiring use of a re-clustering operation.

14. The non-transitory storage medium as recited in claim 10, wherein each node is initially assigned a suspicion score of zero.

15. The non-transitory storage medium as recited in claim 10, wherein a suspicion score of each node is updated each time a round of the federated learning process involving the nodes is performed.

16. The non-transitory storage medium as recited in claim 10, wherein each node comprises a respective edge device.

17. The non-transitory storage medium as recited in claim 10, wherein a suspicion score of one of the suspicious nodes is used to determine a security policy.

18. The non-transitory storage medium as recited in claim 10, wherein as one or more rounds of the federated learning process and a re-clustering process are performed, respective suspicion scores for each of the nodes are refined using a normalization process.

\* \* \* \* \*

UNITED STATES PATENT AND TRADEMARK OFFICE
CERTIFICATE OF CORRECTION

| | | |
|---|---|---|
| PATENT NO. | : 12,425,419 B2 | Page 1 of 1 |
| APPLICATION NO. | : 18/065064 | |
| DATED | : September 23, 2025 | |
| INVENTOR(S) | : Paulo Abelha Ferreira et al. | |

It is certified that error appears in the above-identified patent and that said Letters Patent is hereby corrected as shown below:

On the Title Page

Item (54) and in the Specification Column 1, Lines 1-5, change "Lightweight Attacker Identification..." to – A Lightweight Attacker Identification... –

In the Specification

Column 4
Line 52, change "In embodiment" to – In an embodiment –

Column 9
Line 40, change "generated 606 606" to – generated 606 –

Column 10
Line 18, change "central model" to – central model. –

Signed and Sealed this
Twenty-third Day of December, 2025

John A. Squires
*Director of the United States Patent and Trademark Office*